United States Patent [19]

Mizuno et al.

[11] Patent Number: 4,727,818

[45] Date of Patent: Mar. 1, 1988

[54] EMBROIDERY MACHINE APPARATUS

[75] Inventors: Takashi Mizuno; Akihiro Kobayashi, both of Chofu, Japan

[73] Assignee: Tokyo Juki Industrial Co., Ltd., Tokyo, Japan

[21] Appl. No.: 908,241

[22] Filed: Sep. 17, 1986

[30] Foreign Application Priority Data

Sep. 30, 1985 [JP] Japan .................................. 60-218322

[51] Int. Cl.⁴ ............................................... D05C 5/06
[52] U.S. Cl. ...................................... 112/78; 112/103; 112/121.12; 112/458; 112/457
[58] Field of Search ................ 112/453, 454, 456, 457, 112/458, 121.12, 78, 98, 103, 445, 447

[56] References Cited

U.S. PATENT DOCUMENTS

| 4,200,048 | 4/1980 | Makabe et al. | 112/458 X |
| 4,201,144 | 5/1980 | Manabe et al. | 112/121.12 |
| 4,445,449 | 5/1984 | Kuzuya et al. | 112/458 X |
| 4,469,035 | 9/1984 | Bergvall | 112/453 |
| 4,512,271 | 4/1985 | Herdeg et al. | 112/458 X |

Primary Examiner—Peter Nerbun
Attorney, Agent, or Firm—Morgan & Finnegan

[57] ABSTRACT

An automatic embroidery machine operated according to stitch data stored in a memory device provides a secondary central processing unit, a secondary random access memory, and a secondary code input means such that subsequent stitch data may be input during current stitch work thereby increasing the work efficiency of the embroidery machine.

1 Claim, 2 Drawing Figures

EMBROIDERY MACHINE APPARATUS

BACKGROUND OF THE INVENTION

This invention relates to automatic embroidery machines. More particularly, this invention relates to automatic embroidery machines using stitch data stored in memory storage devices.

In conventional automatic embroidery machines which read stitch data from a memory storage device, store the stitch data in a micro computer memory, and then stitch according to the stitch data, it is impossible to set new stitch data by a setting means such as a keyboard until the current stitch work is completed. Thus, time is wasted when stitching from current stitch work to subsequent stitch work and the actual operation time of the embroidery machine is reduced.

SUMMARY OF THE INVENTION

With the foregoing in mind it is an object of the invention to provide a new and improved apparatus to increase the work efficiency of an embroidery machine.

The apparatus according to the invention meets this and other objects by providing a secondary code/input device, a secondary memory device to store subsequent codes, and a secondary reading device to read the codes.

BRIEF DESCRIPTION OF THE DRAWINGS

The accompanying drawings, referred to herein and constituting a part hereof, illustrate a preferred embodiment of the invention and, together with the description, serve to explain the principles of the invention, wherein.

DETAILED DESCRIPTION OF THE DRAWINGS

Figure 1:
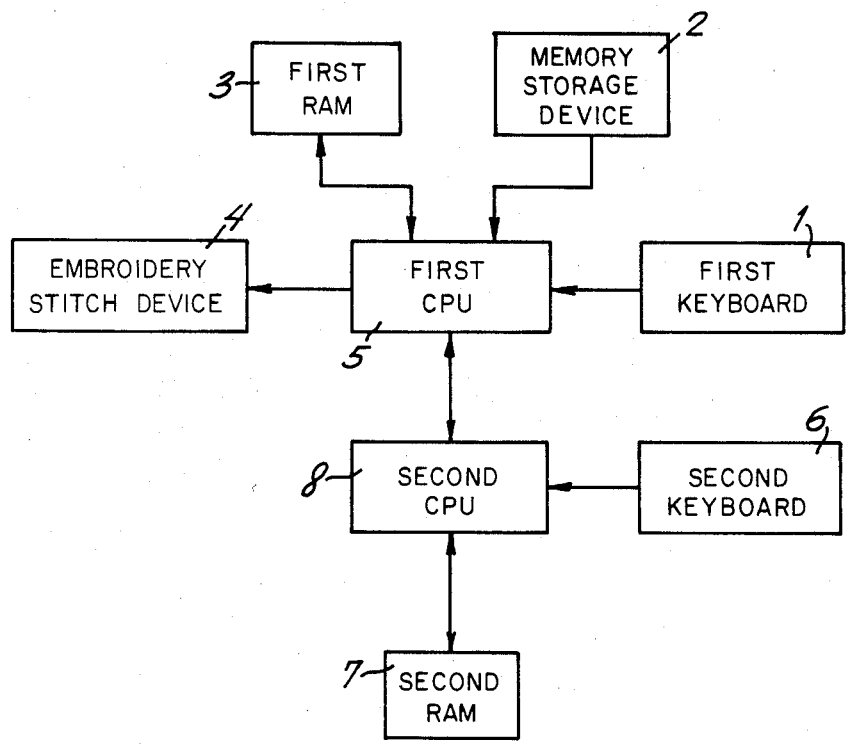
FIG. 1 is a block diagram of an apparatus according to the invention.
Figure 2:
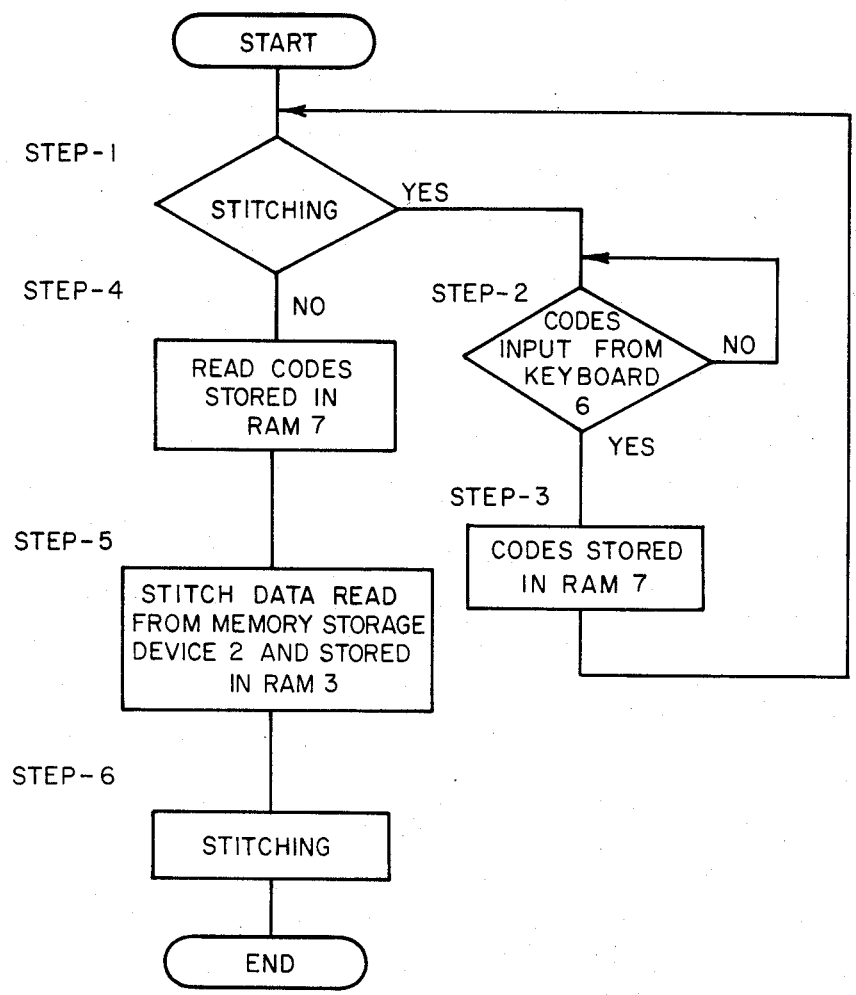
FIG. 2 is a flow chart of one embodiment according to the invention.

Referring to drawings FIG. 1 and FIG. 2, one embodiment of the present invention will be explained. In FIG. 1, numeral 1 denotes a first keyboard to input codes and numeral 2 denotes a memory storage device adapted to store a plurality of stitch data (e.g., a floppy disc). Numeral 3 denotes a first RAM (random access memory) device which stores stitch data read from the memory storage device 2. Numeral 4 denotes an embroidery stitch device and numeral 5 denotes a first CPU (central processing unit) which controls the memory storage device 2 and the RAM device 3.

Numeral 6 denotes a secondary keyboard and numeral 7 denotes a secondary RAM device which stores codes input from secondary keyboard 6. Numeral 8 denotes a secondary CPU which reads out the codes from secondary RAM device 7.

Referring to the flow chart of FIG. 2, the operation of one embodiment of the invention will be explained hereafter. During stitching (step 1), if secondary keyboard 6 inputs codes (step 2), the input codes are stored in secondary RAM device 7 by secondary CPU 8 (step 3). When the stitch work is finished, the first CPU 5 (the first reading means and the first storage means) reads the codes which were stored in secondary RAM device 7. Thereafter, the first CPU 5 reads from the memory storage device 2 the stitch data which corresponds to the codes and stores them in first RAM device 3 (step 5). The first CPU 5 controls an embroidery stitch device 4 according to the stitch data stored in first RAM device 3 thus performing stitching work (step 6).

Code input during non-stitching is conducted by the first keyboard 1. When the codes are input from the first keyboard 1, the stitch data corresponding to this code is read from the memory storage device 2 by first CPU 5, and is stored in the first RAM device 3. The embroidery stitch device 4 stitches according to the stitch data stored in first RAM device 3.

As many apparently widely different embodiments of the invention may be made without departing the spirit and scope therein, it is to be understood that invention is not limited to the specific embodiment thereof except as defined in the appended claims.

What is claimed:

1. In an automatic embroidery machine wherein the embroidery mechanism is controlled by stitch data read out from a stitch data storage means by a first reading means and stored in a first memory means by a first storage means according to selected data codes input through a first code input means, a control device comprising:

a secondary code input means to input codes;

a secondary memory means to store codes input by said secondary code input means; and a secondary reading means to read codes input to said secondary memory means.

* * * * *